US005373051A

United States Patent [19]

Lewis et al.

[11] Patent Number: 5,373,051
[45] Date of Patent: Dec. 13, 1994

[54] ROOM TEMPERATURE SETTING CARBONACEOUS CEMENT WITH INCREASED OXIDATION RESISTANCE

[75] Inventors: Irwin C. Lewis, Strongsville; Terrence A. Pirro, Cleveland; Ronald A. Greinke, Medina; Richard I. Bretz; Dennis J. Kampe, both of Parma, all of Ohio

[73] Assignee: Ucar Carbon Technology Corporation, Danbury, Conn.

[21] Appl. No.: 135,153

[22] Filed: Oct. 12, 1993

Related U.S. Application Data

[63] Continuation-in-part of Ser. No. 870,319, Apr. 17, 1992, Pat. No. 5,280,063.

[51] Int. Cl.$^5$ .................. C08L 61/10; C08K 5/15; C08K 3/38; C08K 3/32
[52] U.S. Cl. ................... 524/594; 524/111; 524/130; 524/145; 524/171; 524/319; 524/404; 524/405; 524/414; 524/417; 524/540; 524/541; 524/593

[58] Field of Search ............... 524/111, 414, 417, 495, 524/496, 540, 541, 593, 594, 404, 405, 130, 145, 171, 319, 847

[56] References Cited

U.S. PATENT DOCUMENTS

| | | | |
|---|---|---|---|
| 4,100,314 | 7/1978 | Wellovch et al. | 423/445 R |
| 4,915,874 | 4/1990 | Nakardni et al. | 524/495 |
| 5,002,981 | 3/1991 | Chiu | 523/141 |

FOREIGN PATENT DOCUMENTS

| | | | |
|---|---|---|---|
| 0098378 | 7/1983 | Japan | 524/496 |
| 0272666 | 10/1989 | Japan | 524/496 |

*Primary Examiner*—Peter Szekely
*Attorney, Agent, or Firm*—F. J. McCarthy

[57] ABSTRACT

A room temperature setting carbonaceous cement comprising a solid carbonaceous material, a catalyst and a liquid carbonizable component, and a boron containing or phosphorus containing material, which when treated with the catalyst will possess increased oxidation resistance at elevated temperatures.

13 Claims, No Drawings

ROOM TEMPERATURE SETTING CARBONACEOUS CEMENT WITH INCREASED OXIDATION RESISTANCE

This application is a continuation-in-part of prior application Ser. No. 07/870,319 filed Apr. 17, 1992 U.S. Pat. No. 5,280,063.

FIELD OF THE INVENTION

This invention relates to a room temperature setting carbonaceous cement containing a boron or phosphorus containing additive to improve oxidation resistance at elevated temperatures.

BACKGROUND OF THE INVENTION

A carbonaceous cement is composed of an admixture of a carbonaceous material and a thermosetting resin and is conventionally used to bond carbon and graphite structures at elevated temperature. Typically the cement will not set below about 100° C. and will cure and develop a full bond strength at a higher temperature. A carbonaceous cement is currently available from the UCAR Carbon Company, designated as C34 with a composition which is fully described in U.S. Pat. No. 3,441,529. This cement requires heat treatment to 150–200° C. to achieve setting and full curing and to develop a useful flexural strength of about 2000 psi. The strength is retained on subsequent baking to 850° C. The heat treatment requirement for the C-34 cement presents a substantial practical limitation for use at construction sites where appropriate equipment to heat cemented structures is generally not available. A room temperature setting cement described in Light Metals p. 759 (1991) is also commercially available and currently used by the aluminum industry for cementing collector bars onto cathodes in the production of aluminum. However this cement, which is a three component system, achieves a strength of only about 304 psi after curing and loses most of its strength after baking to 900° C. This cement contains an epoxy resin as the thermosetting liquid, a separate catalyst and a carbon solid. Epoxy resins are known to have limited thermal stability and to give very low carbon yields on baking. It is for this reason that this commercial cement retains very little strength at high baking temperatures. For more general application it is very desirable to have a cement which can set at room temperature and provide adequate strength to permit physical handling without suffering loss in strength after curing and baking. For this purpose it is desirable for the cement to contain a thermosetting resin which can provide a high carbon yield after curing and baking. The minimum strength deemed necessary to satisfy this requirement is an average strength of at least about 500 psi and preferably above 1000 psi. The three component carbonaceous cement which is presently available commercially will set at room temperature but does not provide the minimum strength required at room temperature for more general applications or the ability to retain the minimum strength after curing and baking. It is important in many industrial operations that the cement have a high oxidation resistance at elevated temperatures.

SUMMARY OF THE INVENTION

A carbonaceous thermosetting cement system has been developed in accordance with the present invention which will set at room temperature to provide a rigid cement with an average strength of at least about 750 psi. The setting reaction at room temperature is sufficiently slow that the cement can be applied practically and safely within one to two hours and then develop high strength by further setting at room temperature for up to twenty four hours or longer. This cement increases substantially in strength after full curing at 150° C. and retains a high strength after baking to 850° C.

The carbonaceous cement of the present invention broadly comprises a solid component of a carbonaceous material, a catalyst and a liquid carbonizable component. The solid component preferably comprises an admixture of carbonaceous particles, a phenolic resin and a strong acid catalyst selected from the group consisting of p-toluene sulfonic acid, benzene sulfonic acid, tri-chloroacetic acid, naphthalene disulfonic acid and benzene disulfonic acid. The liquid component is preferably composed of a liquid phenolic dissolved in furfuraldehyde. The catalyst can be provided as a separate third component as either a solid or a solution of the solid. Strong acids which are liquid such as trifluoroacetic acid, sulfuric acid, methane sulfonic acid, phosphoric acid, can be used as catalysts.

The liquid component of the present cement when combined with the catalyst of the solid component provides a very high carbon yield of at least 40–50% on baking, resulting in a retention of strength at high temperature.

In order to inhibit oxidation of the cement, boron and phosphorus containing additives are added to the room temperature setting cement of the present invention. Boron additives include boric acid, boron carbide, boron powder and borate salts. Phosphorus additives include organic phosphorus compounds such as tributylphosphate, phosphate esters, organophosphorus acids or inorganic phosphorus compounds such as phosphoric acid, phosphorus pentoxide, or neutral or acidic phosphate salts. Basic phosphate salts such as ammonium phosphate react with PTSA catalyst and are unsuitable. The inhibitor can be added as a solid to the solid component of the cement or dissolved in the liquid portion of the cement. If the inhibitor is phosphoric or boric acid it should not be dissolved in the liquid for storage since it will polymerize the furfuraldehyde liquid.

When boron containing oxidation inhibiting compound is employed, a minimum of 0.25 pph of boron (measured as boron and based on the total weight of the cement) should be added to the formulation to obtain optimum levels of inhibition. Larger amounts of a boron containing inhibitor can be added, up to 1.0 pph but additional reduction of the oxidation rate of the cured cement may not be achieved.

When phosphorus containing oxidation inhibiting compound is used, a minimum of 0.13 pph of phosphorus (based on the total weight of the cement) should be added to the formulation. Larger amounts of the phosphorus containing compound, up to 0.52 pph phosphorus may be added, but the extra additive may not additionally reduce the oxidation rate of the cured cement.

Other advantages of the invention will become apparent from the following detailed description of the invention.

DETAILED DESCRIPTION OF A PREFERRED EMBODIMENT OF THE INVENTION

The carbonaceous cement of the present invention is preferably provided as a two component system although it may be made available as a three component system. The two component system includes a solid portion and a liquid portion with the solid portion preferably comprising a mixture of a solid phenolic resin, a suitable carbonaceous material selected from the group consisting of graphite flour, petroleum coke flour, carbon black, pitch coke flour, calcined lampblack flour and the like and a solid acid catalyst. The solid acid catalyst should be selected from the group consisting of p-toluene sulfonic acid, benzene sulfonic acid, trichloroacetic acid, naphthalene disulfonic acid and benzene disulfonic acid. The solid phenolic resin can be omitted from the solid component but the strength will be reduced.

The liquid portion comprises a solution of a phenolic resin in furfuraldehyde. Any conventional phenolic resin preferably of the resol type or a novolac (without catalyst) can be employed in the solid and/or liquid portion of the carbonaceous cement of the instant invention. However, the phenolic resin should not have any amine or basic catalyst component since this will neutralize the acid catalyst of the cement. The acid catalyst catalyzes the polymerization and carbonization of the furfuraldehyde liquid. The liquid containing the dissolved phenolic resin will give a bake carbon yield of at least 40% when treated with the catalyst of the solid component. The phenolic resin can be removed from the liquid portion and still permit room temperature setting by catalysis of furfural. However the liquid carbon yield will be reduced by about one half and the cured and bake strength will also be reduced.

In the two component system the solid component is preferably composed of carbonaceous particles of graphite powder, carbon black, a solid acid catalyst and a solid phenolic resin. Preferred carbon blacks are gas blacks, which are made by the passage of natural gas over hot refractories. A suitable carbon black is available under the trademark "Thermax" from Cancurb Co., Alberta, Canada. Although preferred, the carbon black component may be omitted from the composition of the solid component. The solid component may also be composed of graphite and Thermax with the phenolic component omitted but the cement strength will be diminished.

The cement may also be formulated as a three component system consisting of a solid and liquid component as above described for the two component system with an acid catalyst provided as a separate third component in the form of a fluid solution in water or alcohol. Liquid acids such as trifluoroacetic acid, sulfuric acid, phosphoric acid and the like can be used as a separate third component.

Suitable amounts of the carbonaceous particles in the total cement of the invention are from about 40 wt % to about 75 wt%, preferably from about 55 wt % to about 65 wt %. When the carbonaceous particles in the solid component are composed of graphite powder and Thermax carbon black, the graphite powder is present in an amount of about 30 wt % to about 50 wt % and the Thermax carbon black is present in an amount of from about 10 wt % to about 30 wt % based upon the weight of the cement. The minimum concentration of catalyst to achieve a room temperature setting will depend upon the selection of the catalyst. When p-toluene sulfonic acid is used as the acid catalyst a room temperature setting can be achieved in less than twenty four hours with as little as about 2.0 weight percent acid catalyst based upon the weight of the cement.

The following examples illustrate a two and three component cement in accordance with the present invention:

EXAMPLE 1

THREE COMPONENT CEMENT

A three component cement consisting of a solid, liquid, and a catalyst was prepared using the following compositions:

| Solid: | Graphite Flour | 70 g |
|---|---|---|
| | (Thermax) Carbon Black | 30 g |
| | Phenolic Resin | 20 g |
| Liquid: | 50% by Volume Resol Phenolic Resin in Furfuraldehyde | 40 g |
| Catalyst: | 75/25 by Weight p-Toluene Sulfonic Acid in Water | 5 g |

The graphite flour is milled graphite at least 60% passes through a 200-mesh screen.

The three components were thoroughly mixed and then used to cement two pieces of isotropic ATJ graphite. The cemented graphite pieces were tested after sitting at room temperature for six days and the cement bond strength was measured as 1260 psi.

A second set of cemented pieces was cured to fully cross-link the cement bond by heating at 140° C. for one hour. The cured cemented pieces were then tested for bond strength and the graphite specimens broke at a strength value of 3000 psi while the joint was still intact. The joint strength therefore exceeded 3000 psi.

A third set of cemented samples was also cured at 140° C., baked to 850° C., and then tested for strength. The strength value after baking was measured at 1780 psi.

EXAMPLE 2

TWO COMPONENT CEMENT

A two component cement was prepared with only a solid and a liquid component. The cement had the following compositions:

| Solid: | Graphite Flour | 70 g |
|---|---|---|
| | (Thermax) Carbon Black | 30 g |
| | Phenolic Resin | 20 g |
| | p-Toluene Sulfonic Acid | 3.75 g |
| Liquid: | 50% by Volume Resol Phenolic Resin in Furfuraldehyde | 40 g |

The cementing and testing was carried out identically to Example 1. The strength after room temperature setting for about 6 days was 1180 psi. The bonded piece after curing developed a strength greater than 3000 psi since the graphite rather than the cemented bond broke after testing. Cemented pieces tested after being baked to 850° C. gave strength values of 1620 psi.

The solid components with PTSA catalyst were stored for three months at room temperature without altering the bonding properties of the cement.

EXAMPLE 3

TWO COMPONENT CEMENT

The cement of Example 2 was tested after setting at room temperature for 24 hours. The cement had completely solidified showing it had set and the flexural strength was measured as 620 psi. After curing at 140° C. for one hour the flexural strength exceeded 3000 psi. A sample that was baked to 850° C. had a strength of 1600 psi.

EXAMPLE 4

Increase of Liquid Content

The cement of Example 2 was prepared using twice the amount of liquid to provide a cement with a lower viscosity. The composition of this cement was:

|  |  | Weight | Wt % |
|---|---|---|---|
| (Solids | Graphite Flour | 70.0 g | 34.35 |
| and | (Thermax) Carbon Black | 30.0 g | 14.73 |
| Catalyst) | Phenolic Resin | 20.0 g | 9.82 |
|  | p-Toluene Sulfonic Acid Monohydrate | 3.75 g | 1.84 |
| Liquid: | 50% by Volume Resol Phenolic Resin in Furfuraldehyde | 80.0 g | 39.26 |

After 24 hours at room temperature, this cement was fully set showing that the catalyst level was sufficient.

EXAMPLE 5

DECREASE OF CATALYST CONTENT

The cement of Example 4 was repeated except that the p-toluene sulfonic acid catalyst level was reduced by 50% to 1.875 grams. After 96 hours at room temperature, the cement was still fluid indicating it had not fully set.

|  |  | Weight | Wt % |
|---|---|---|---|
| (Solids | Graphite Flour | 70.0 g | 34.67 |
| and | (Thermax) Carbon Black | 30.0 g | 14.86 |
| Catalyst) | Phenolic Resin | 20.0 g | 9.91 |
|  | p-Toluene Sulfonic Acid Monohydrate | 1.875 g | 0.93 |
| Liquid: | 50% by Volume Resol Phenolic Resin in Furfuraldehyde | 80.0 g | 39.63 |

Example 6

Removal of Phenolic from Liquid Component (a) A cement was prepared similar to Example 1, except that the liquid component contained furfuraldehyde without any added phenolic resin. A small amount of Polyox, a trademark product of Union Carbide Corporation for a water soluble polyethylene oxide resin, was added as a thickener. The cement had the following composition:

| Solids: | Graphite Flour | 17.5 gms |
|---|---|---|
|  | (Thermax) Carbon Black | 7.5 gms |
|  | Phenolic Resin | 5.0 gms |
| Liquid: | Furfuraldehyde | 9.9 gms |
|  | Polyox | 0.2 gms |
| Catalyst: | 75% by Weight p-Toluene Sulfonic Acid in Water | 2.5 gms |

This material appeared to set to a solid at room temperature after about 24 hours. The cement was completely cured by heating to 200° C. in argon for two hours. The cure yield was 89.8%. The cement was then baked by heating to 800° C. in an inert atmosphere and held at 800° C. for one hour. The bake carbon yield was 86.5% giving an overall yield of 77.7% (89.8 × 0.865).

(b) For comparison a cement similar to Example 1 was prepared with the following composition:

| Solids: | Graphite Flour | 17.5 gms |
|---|---|---|
|  | (Thermax) Carbon Black | 7.5 gms |
|  | Phenolic Resin | 5.0 gms |
| Liquid: | Furfuraldehyde | 5.0 gms |
|  | Phenolic Resin | 5.0 gms |
| Catalyst: | 75% by Weight p-Toluene Sulfonic Acid in Water | 1.3 gms |

This cement gave a cure yield of 98.0%, a bake yield of 82.8% and an overall yield of 81.1%. The lower carbon yield of the example of (7a) would be expected to lead to reduced strength.

EXAMPLE 7

REMOVAL OF PHENOLIC RESIN FROM THE SOLID PORTION

A cement similar to Example 1 was prepared except that there was no phenolic resin in the solids. The composition follows:

| Solids: | Graphite Flour | 20.0 gms |
|---|---|---|
|  | (Thermax) Carbon Black | 9.0 gms |
| Liquid: | Furfuraldehyde | 5.0 gms |
|  | Phenolic (Resol) Resin | 5.0 gms |
| Catalyst: | 75% by Weight p-Toluene Sulfonic Acid in Water | 1.26 gms |

After sitting at room temperature for 24 hours, the cement had solidified.

The cement was fully cured by holding at 200° C. in an argon atmosphere for two hours and gave a cure yield of 90.7%. However, the cured cements were porous and had a poorer structure than the baked cements of Examples 1 and 2.

EXAMPLE 8

BORIC ACID ADDITION

A cement similar to that of Example 1 was prepared except that boric acid was added as an oxidation inhibitor.

| Solids Including | Graphite Flour | 70.0 g |
|---|---|---|
| Catalyst and | (Thermax) Carbon Black | 30.0 g |
| Inhibitor | Phenolic Resin | 20.0 g |
|  | p-Toluene Sulfonic Acid Monohydrate | 3.75 g |
|  | Boric Acid | 3.15 g |
| Liquid | 50% by Volume Resol Phenolic Resin in Furfuraldehyde | 80.0 g |

Oxidation Test: A sample of cement was cured at 150° C. for one hour, baked at 850° C. for one hour in an inert atmosphere, and then oxidized in air at 670° C. for two hours, A sample of the baked inhibited cement was oxidized along with a similarly sized and shaped sample of the baked uninhibited cement which contained no boric acid, The percent weight loss of the inhibited sample was compared to the percent weight loss of an uninhibited sample of cement, The oxidation rate of the uninhibited cement was assigned a value of 100, The relative oxidation rate of the inhibited cement above was 56 i.e. almost 50% less,

EXAMPLE 9

BORIC ACID ADDITION

A cement similar to Example 8 was prepared except that higher levels of boric acid were added.

| Solids including Catalyst and Inhibitor | Graphite Flour | 70.0 g |
| --- | --- | --- |
| | (Thermax) Carbon Black | 30.0 g |
| | Phenolic Resin | 20.0 g |
| | p-Toluene Sulfonic Acid Monohydrate | 3.75 g |
| | Boric Acid | 6.25 g |
| Liquid | 50% by Volume Resol Phenolic Resin in Furfuraldehyde | 80.0 g |

The relative oxidation rate of this inhibited cement was 53. The increased boric acid did not significantly reduce the oxidation rate.

EXAMPLE 10

TRIBUTYL PHOSPHATE (ORGANOPHOSPHATE) ADDITION

A cement similar to Example 1 was prepared except that tributyl phosphate was added as an oxidation inhibitor.

| Solids including Catalyst | No. 60 Graphite Flour | 70.0 g |
| --- | --- | --- |
| | (Thermax) Carbon Black | 30.0 g |
| | Phenolic Resin | 20.0 g |
| | p-Toluene Sulfonic Acid Monohydrate | 3.75 g |
| Liquid Inhibitor | 50% by Volume Resol Phenolic Resin in Furfuraldehyde | 80.0 g |
| | Tributyl Phosphate | 1.5 g |

The relative oxidation rate of this inhibited cement was 88.

EXAMPLE 11

TRIBUTYL PHOSPHATE (ORGANOPHOSPHATE) ADDITION

A cement similar to Example 10 except that an additional amount of tributyl phosphate was added as an oxidation inhibitor.

| Solids including Catalyst | Graphite Flour | 70.0 g |
| --- | --- | --- |
| | (Thermax) Carbon Black | 30.0 g |
| | Phenolic Resin | 20.0 g |
| | p-Toluene Sulfonic Acid Monohydrate | 3.75 g |
| Liquid Inhibitor | 50% by Volume Resol Phenolic Resin in Furfuraldehyde | 80.0 g |
| | Tributyl Phosphate | 2.35 g |

The relative oxidation rate of this inhibited cement was 48. The relative oxidation rate in this example was lower than in Example 10. This indicates that in Example 10 insufficient inhibitor was added.

EXAMPLE 12

TRIBUTYL PHOSPHATE (ORGANOPHOSPHATE) ADDITION

A cement similar to Example 11 was prepared except that additional tributyl phosphate was added.

| Solids including Catalyst | Graphite Flour | 70.0 g |
| --- | --- | --- |
| | (Thermax) Carbon Black | 30.0 g |
| | Phenolic Resin | 20.0 g |
| | p-Toluene Sulfonic Acid Monohydrate | 3.75 g |
| Liquid Inhibitor | 50% by Volume Resol Phenolic Resin in Furfuraldehyde | 80.0 g |
| | Tributyl Phosphate | 3.1 g |

The relative oxidation rate of this inhibited cement was 50.

EXAMPLE 13

TRIBUTYL PHOSPHATE (ORGANOPHOSPHATE) ADDITION

A cement similar to Example 12 but with even higher levels of tributyl phosphate was prepared.

| Solids including Catalyst | Graphite Flour | 70.0 g |
| --- | --- | --- |
| | (Thermax) Carbon Black | 30.0 g |
| | Phenolic Resin | 20.0 g |
| | p-Toluene Sulfonic Acid Monohydrate | 3.75 g |
| Liquid Inhibitor | 50% by Volume Resol Phenolic Resin in Furfuraldehyde | 80.0 g |
| | Tributyl Phosphate | 4.65 g |

The relative oxidation rate of this inhibited cement was 57. These further additions of tributyl phosphate in Examples 12 and 13 did not further improve the oxidation rate.

Neutral or acidic inhibitors containing phosphorus or boron should not deactivate the catalyst. The inhibitor, if it is a solid, would be placed into the solids component of the cement. A non-acidic inhibitor could be placed into the liquid component of the cement and be inert during storage. Strong liquid acids such as phosphoric can be used as both an inhibitor and catalyst but in this case should then be used as a separate third component. Basic additives such as ammonium monohydrogen phosphate and ammonium dihydrogen phosphate have been found to deactivate the catalyst.

What is claimed is:

1. A carbonaceous cement consisting of a first solid component, a second liquid component and a third component containing a catalyst with said first solid component comprising an admixture of carbonaceous particles, a phenolic resin and an oxidation inhibiting material selected from boron, boron compounds, organic phosphorus compounds, phosphoric acid, phosphorus oxide and neutral and acidic phosphate salts, said second liquid component comprising a liquid resol phenolic dissolved in furfuraldehyde and wherein said catalyst consists of a strong acid selected from the group consisting of p-toluene sulfonic acid, benzene sulfonic acid, dissolved in water or alcohol.

2. A room temperature setting carbonaceous cement comprising a solid component in the form of an admixture of a carbonaceous material, a boron-containing or phosphorus-containing oxidation inhibitor, a catalyst and a liquid component in the form of a carbonizable liquid for providing said cement with a carbon yield of at least 40% at an elevated baking temperature up to and above 800° C., having increased oxidation resistance at elevated temperatures.

3. A room temperature setting cement as claimed in claim 7 wherein said carbonaceous material is selected from the group consisting of graphite flour, petroleum coke flour, carbon black, pitch coke flour and calcined lampblack flour.

4. A room temperature setting cement as claimed in claim 3 wherein said catalyst is an acid catalyst selected from the group consisting of p-toluene sulfonic acid, benzene sulfonic acid, trichloroacetic acid, naphthalene disulfonic acid, benzene disulfonic acid, trifluroacetic acid, sulfuric acid and methanesulfonic acid.

5. A room temperature setting cement as claimed in claim 4 wherein said carbonizable liquid comprises furfuraldehyde.

6. A room temperature setting cement as claimed in claim 5 wherein said carbonizable liquid further comprises a phenolic resol resin dissolved in said furfuraldehyde.

7. A room temperature setting cement as claimed in claim 6 wherein said admixture further comprises a solid phenolic resin.

8. A room temperature setting cement as defined in claim 7 wherein the concentration of said carbonaceous particles are from 40 wt % to about 75 wt % based on the weight of the cement.

9. A room temperature setting cement as defined in claim 8 wherein said carbonaceous particles are composed of graphite powder and carbon black.

10. A room temperature setting cement as defined in claim 9 wherein the graphite powder is present in an amount of from 30 wt % to about 50 wt % and the carbon black is present in an amount of from about 10 wt % to about 30 wt % based on the weight of the cement.

11. A room temperature cement as defined in claim 2 wherein the concentration of said boron containing oxidation inhibitor material is at least 0.25 pph of boron based on the total weight of cement.

12. A room temperature cement as defined in claim 2 wherein the concentration of said phosphorus containing oxidation inhibitor material is at least 0.13 pph of phosphorus based on the total weight of cement.

13. A room temperature cement in accordance with claim 2 wherein the catalyst is a liquid acid selected from phosphoric acid, trichloroacetic acid, naphthalene disulfonic acid, benzene disulfonic acid, trifluroacetic acid, sulfuric acid and methanesulfonic acid.

* * * * *

UNITED STATES PATENT AND TRADEMARK OFFICE
CERTIFICATE OF CORRECTION

PATENT NO. : 5,373,051
DATED : December 13, 1994
INVENTOR(S) : I.C. LEWIS ETAL

It is certified that error appears in the above-identified patent and that said Letters Patent is hereby corrected as shown below:

On the title page item [73],
<u>Assignee</u> - "Ucar" should be --UCAR--

Column 8, line 50, claim 1, line 6, between "from" and "boron" insert
--the group consisting of--

Signed and Sealed this

Sixth Day of June, 1995

BRUCE LEHMAN

Attest:

Attesting Officer

Commissioner of Patents and Trademarks